(12) United States Patent
Theiss (10) Patent No.: US 11,235,947 B2
(45) Date of Patent: Feb. 1, 2022

(54) LINE GUIDING SYSTEM FOR AT LEAST ONE SUPPLY LINE WHICH CAN BE COILED AND UNCOILED AND ROTARY GUIDE THEREFOR

(71) Applicant: IGUS GMBH, Cologne (DE)

(72) Inventor: Georg Theiss, Cologne (DE)

(73) Assignee: IGUS GMBH, Cologne (DE)

( * ) Notice: Subject to any disclaimer, the term of this patent is extended or adjusted under 35 U.S.C. 154(b) by 593 days.

(21) Appl. No.: 16/095,331

(22) PCT Filed: Apr. 20, 2017

(86) PCT No.: PCT/EP2017/059422
§ 371 (c)(1),
(2) Date: Oct. 19, 2018

(87) PCT Pub. No.: WO2017/182583
PCT Pub. Date: Oct. 26, 2017

(65) Prior Publication Data
US 2020/0185900 A1    Jun. 11, 2020

(30) Foreign Application Priority Data
Apr. 20, 2016 (DE) .................... 20 2016 102 087.5

(51) Int. Cl.
B65H 75/44 (2006.01)
F16G 13/16 (2006.01)
H02G 11/02 (2006.01)

(52) U.S. Cl.
CPC ......... *B65H 75/4449* (2013.01); *F16G 13/16* (2013.01); *H02G 11/02* (2013.01); *B65H 2701/33* (2013.01); *B65H 2701/34* (2013.01)

(58) Field of Classification Search
CPC ...... F16G 13/16; H02G 11/006; H02G 11/02; B65H 75/4449; B65H 2701/34
See application file for complete search history.

(56) References Cited

U.S. PATENT DOCUMENTS 3,106,368 A    10/1963   Tait et al.
5,332,171 A    7/1994    Steff
(Continued)

FOREIGN PATENT DOCUMENTS

DE    1196740    7/1965
DE    2024993    12/1971
(Continued)

OTHER PUBLICATIONS

English translation of International Search Report from corresponding PCT Appln. No. PCT/EP2017/059422, dated Aug. 28, 2017.
(Continued)

*Primary Examiner* — Zachary L Kuhfuss
(74) *Attorney, Agent, or Firm* — Grossman, Tucker, Perreault & Pfleger, PLLC (57) ABSTRACT

The proposed line guiding system for at least one heavy and/or rigid line, for example a power cable for shore-side power supply for a ship (alternative maritime power), has a winding device which is rotatable about an axis of rotation for coiling and uncoiling the line and a rotary guide for the line from a first point to a relatively rotatable second point. The rotary guide has a helical guiding course having first helical layers, in which the line is wound about the axis of rotation, and second helical layers, in which the line is wound in the opposite direction. A return curve connects the two helical layers. According to the invention, the rotary guide has a tubular support sleeve which is coaxial with respect to the axis of rotation and serves to support the helical layers radially outwards or radially inwards. Furthermore, a rotary decoupling structure is provided, by which helical layers supported on the support sleeve are decoupled from the winding device.

21 Claims, 4 Drawing Sheets

(56) References Cited

U.S. PATENT DOCUMENTS

| | | | |
|---|---|---|---|
| 6,387,002 B1 | 5/2002 | Gunter | |
| 7,484,351 B2 | 2/2009 | Harada et al. | |
| 9,840,787 B2 | 12/2017 | Kitada et al. | |
| 10,088,015 B2 | 10/2018 | Theiss | |
| 10,221,037 B1 * | 3/2019 | Blasbalg | B65D 85/04 |
| 10,779,386 B2 * | 9/2020 | Limmer | A61B 6/4441 |

FOREIGN PATENT DOCUMENTS

| | | |
|---|---|---|
| DE | 4108534 | 9/1992 |
| DE | 19708654 | 9/1998 |
| DE | 10259352 | 7/2003 |
| DE | 202014103274 | 9/2014 |
| DE | 202015100472 | 3/2015 |
| DE | 102012110967 | 8/2016 |
| EP | 2535303 | 12/2012 |
| EP | 2549144 | 1/2013 |
| JP | 5528148 | 2/1980 |
| JP | 2006-304559 | 11/2006 |
| WO | 98/31950 | 1/1998 |
| WO | 2011/086198 | 7/2011 |

OTHER PUBLICATIONS

English translation of the International Preliminary Report on Patentability from corresponding PCT Appln. No. PCT/EP2017/059422, dated Jun. 18, 2018.

English translation of Office Action from related Japanese Appln. No. 2018-554468, dated Mar. 2, 2021.

* cited by examiner

(PRIOR ART)

LINE GUIDING SYSTEM FOR AT LEAST ONE SUPPLY LINE WHICH CAN BE COILED AND UNCOILED AND ROTARY GUIDE THEREFOR

FIELD

The invention relates in general to a line guiding system for at least one line which can be coiled and uncoiled, and to a rotary guide for a line between two points which are rotatable relative to each other.

The invention relates in particular to a line guiding system for one or more lines with a drum-like winding device for coiling and uncoiling the lines, e.g. cables, hoses or the like, said winding device being rotatable about an axis of rotation through a shaft. The line guiding system further comprises a rotary guide for guiding the line(s) from a first point, typically a non-movable fixed point, to a second point which is connected in a rotationally fixed manner to the rotatable winding device, i.e. a point which is rotatable relative to the first point. The rotary guide here has a helical guiding course, having one or more first helical layers, in which the line(s) is/are helically wound about the axis of rotation, one or more second helical layers, in which the line(s) is/are likewise helically wound about the axis of rotation in the opposite direction to the direction of rotation of the first helical layers and having a return curve, which connects the two oppositely wound helical layers to each other, said line(s) being turned in the return curve.

BACKGROUND

The particular helical guiding course with the line(s) being turned between the two helical runs permits a relative rotation of the second point relative to the first point over a large angle of rotation, e.g. of several thousand degrees, without the need for typical rotary feed-throughs. Thus, for example, it is possible to avoid sliding contacts for electrical lines and/or rotary joints for hose lines for supplying gaseous or liquid media.

A line guiding system of this type is already known from the German patent DE 10 2012 110 967. This solution makes it possible, without typical rotary feed-throughs, to coil and uncoil multiple lines, even for different media (electricity, data, gas, liquid etc.) and with different diameters, using a single drum. This configuration is also space-saving, among other things.

To avoid the typical rotary feed-throughs for the lines in this solution, for example, a special rotary guide is used, e.g. according to international patent application WO 2011/086198 A2, with a ribbon-like line guiding device, which guides the lines according to the desired helical guiding course. The particular helical guiding course with oppositely wound coils or turns and with a return arranged therebetween allows continuous lines to be employed, i.e. typical rotary feed-throughs can be avoided.

Various systems constructed according to the principle from DE 10 2012 110 967 A1 are marketed by the applicant (igus GmbH, D-51147 Cologne) under the trade name "e-spool". These line guiding systems have already proved themselves in practice. A limitation to the use of these systems lies in the fact that only relatively small line diameters, e.g. up to about 20 mm, can be employed or that lines with a high specific weight (mass per unit length) cannot be guided.

A similar example for a cable guiding system of this type is known from EP°2°535°303°A1. Although this system also in principle permits guiding of power supply cables, it has practical limits if the cable(s) to be guided is/are particularly heavy or has/have a large conductor cross-section.

A limitation to the practical use of these aforementioned systems lies in the fact that only relatively small line diameters, e.g. up to about 20 mm, can be employed or that lines with a high specific weight (mass per unit length) cannot be guided.

SUMMARY

A first object of the present invention therefore lies in developing a line guiding system and a rotary guide of the type mentioned above in such a way that they can also be used for lines with large line cross-sections or for lines with a high specific weight.

In a generic line guiding system, the first object is achieved in particular by the fact that, to support the helical layers, in particular in a direction radially outwards and/or in a direction radially inwards, the rotary guide has an outer tubular support sleeve and/or an inner tubular support sleeve. The support sleeve(s) here is/are arranged coaxially with the axis of rotation of the drum-like winding device. According to the invention it is further provided here that the rotary guide has a rotary decoupling function, based on which coils or helical layers supported on or abutting the respective support sleeve are decoupled from the rotation of the winding device or are independently rotatable about the axis of rotation. In other words, coils or turns supported on the support sleeve should each be rotatable about the axis of rotation independently of the rotary movement of the drum-like winding device. As a result of this, while some or all of the first helical layers or some or all of the second helical layers can optionally take part in the rotation of the winding device, they are not, however, obliged to perform the same rotary movement.

Without a corresponding decoupling of the rotary movement, the varying radius of the coils during the course of the rotary movement can lead to very high frictional forces occurring through contact with adjacent components—such as e.g. a drive shaft of the winding device. In a radially inwards direction, this would cause a constriction and, e.g. because of tangential static friction forces, very high tensile stresses. Tests have shown that this phenomenon is highly pronounced particularly in lines with a large cross-section or high specific weight. It may lead to the destruction of the line or a blocking of the desired rotary movement. In the opposite direction of rotation, the corresponding problem can occur as a result of an extension or "rearing up" radially outwards since the diameter of the coils or turns tends to increase.

Based on the use of at least one supporting sleeve and its decoupling from the rotation of the drum-like winding device, the undesirable stress explained above can be reliably avoided in at least one radial direction, since causative friction between the relevant relatively moving components is markedly reduced or is avoided altogether.

The rotary guide can in particular be configured such that it guides the helical layers through suitable components in all spatial directions. Thus, the intended relative rotary movement can be transmitted to the respective helical layers and the return curve without undesirable snagging, e.g. as a result of "rearing up", or without jamming, e.g. as a result of constriction.

Depending on the construction, an appropriately decoupled radial support is needed only inwardly, only outwardly or on both sides. This depends e.g. on whether the line is guided in the rotary guide in a non-enclosed or exposed manner or a suitable line guiding device is used within the rotary guide.

A substantial advantage of the arrangement according to the invention is that even particularly heavy lines, e.g. power cables for supplying shore-side electricity to sea-going vessels, can now be coiled and uncoiled by the generic principle, i.e. without a typical rotary feed-through with the aid of sliding contacts or the like, with the aid of a drum-like winding device.

Regardless of whether a drum is used for coiling and uncoiling the desired length of line, even with heavy lines or large-diameter lines, the rotary guide which is likewise proposed avoids the need for typical rotary feed-throughs, i.e. even these lines can now pass without interruption between two points that are rotatable relative to each other.

In the case of lines being guided in a non-enclosed or exposed manner in particular, (i.e. without a line guiding device such as e.g. an energy chain accommodating them), one embodiment provides that an inner tubular support sleeve is provided, which can be rotated relative to the winding device, in particular about the axis of rotation of the winding device, by means of a suitable rotational mounting for the purpose of rotary decoupling.

In addition or alternatively, an outer tubular support sleeve can be provided which can be rotated relative to the winding device, and in particular about the axis of rotation thereof, by means of a rotational mounting for the purpose of rotary decoupling relative to the winding device.

In one embodiment, both support sleeves are mounted individually or jointly in a freely rotating or floating manner in relation to the rotation of the winding device.

Besides the support sleeve(s) that is/are provided being freely rotatable relative to the winding device owing to a suitable rotational mounting, e.g. by means of roller bearings on a shaft, other design options for achieving the function of rotary decoupling also lie within the scope of the invention. For example, the support sleeves can have a plurality of circumferentially distributed support rolls (similar to roller conveyors or roller beds), over which helical layers that are tensioned radially inwards or radially outwards can roll with as little friction as possible.

An arrangement with an inner and an outer support sleeve, each being freely rotatable about the axis of rotation, is advantageous in particular when the line is guided in an exposed manner in the rotary guide. In this case the line can directly abut and be supported on the outer or inner support sleeve, depending on the direction of rotation. If, on the other hand, the line(s) is/are guided in an additional line guiding device, e.g. a suitably designed energy chain, further ways of achieving the function of rotary decoupling are available—as explained below.

In particular, but not exclusively, in the case of lines guided in an exposed manner, one embodiment provides that the rotary guide comprises a support body curved about the axis of rotation for supporting the return curve. The support body in this case has a return region directed in a circumferential direction or tangentially, which is adapted to the desired guiding course, in particular to the radius, of the return curve between the helical layers. The support body here is arranged such that it is freely rotatable relative to the support sleeve(s) provided. The support body can in particular revolve at half the rotational speed of the winding device.

An appropriate support body is preferably guided in an axially displaceable manner between a radially inner and a radially outer support sleeve, and is in particular mounted so as to slide in the manner of a sliding bearing. In this way, inter alia undesirable radial movements of the support body can be limited or prevented while axial mobility is maintained.

Depending on whether the line is guided in an exposed manner or in an additional line guiding device within the rotary guide, the support body preferably has at least on its return region, and optionally also on adjacent running surfaces, a continuous sliding surface to reduce friction. Alternatively or in addition, at least on the return region of the support body, guide rolls can also be provided to reduce friction.

The support body ensures on the one hand the desired curvature in the return region or in the reversal between the oppositely wound helical layers and on the other hand an adequate spacing to avoid friction between the two. The support body can likewise be employed to reduce or prevent an extension or "rearing up" of the helical layers radially outwards and can optionally comprise additional guide parts for this purpose.

Another way of achieving the function of rotary coupling consists in the fact that the rotary guide comprises a suitably designed line guiding device in which the line(s) is/are guided according to the desired helical guiding course with a reversal. In this case, the line guiding device can comprise suitably arranged support rolls for the purpose of the rotary decoupling according to the invention, which can roll e.g. on one or both support sleeves in the operating position.

In such an embodiment, the line guiding device can take the form of an energy chain with pivotally connected chain links. The pivot axis here, in the operating state, is preferably positioned radially to the axis of rotation as far as possible in each case. The chain links each have at least one inner side link, an outer side link and a cross-piece firmly connecting the two. Depending on whether the main effect occurring is a constriction radially inwards, a "rearing up" radially outwards or both, one of the following options or the two combined can be provided for the purpose of rotary decoupling. On the one hand, at least on some of the inner side links, a radially inwardly directed support roll can be provided respectively. These support rolls decouple the rotary movement by rolling over the inner support sleeve or e.g. directly on a shaft of the winding device, avoiding static friction. On the other hand, similarly, at least on some of the outer side links of the energy chain, a radially outwardly directed support roll can be provided respectively. These support rolls can then in particular roll over a radially outwardly provided support sleeve. If an energy chain with support rolls is used, the rotary movement of provided support sleeves is in principle unimportant, i.e. these can take part in the rotation of the second point, for example, and/or can be rotationally fixed relative to the first point.

When a line guiding device is used within the rotary guide, it expediently forms the desired guiding course of the helical layers and is appropriately designed to define this guiding course to a large extent. The line guiding device itself can already reduce the undesirable effects of constriction or extension.

A possible embodiment of an energy chain for forming the helical guiding course has at least one radially outer link strand with the outer side links, which has a greater length in the longitudinal direction than a radially inner link strand with the inner side links. This can be achieved e.g. in the manner of a modular principle by using mirror-symmetrical or identical side links in the link strands, but with at least one additional intermediate piece being provided in the longer, outer link strand between every two pairs of pivotally connected side links. The number of intermediate pieces can be used to adjust the desired lengthening in the longitudinal direction. Likewise, for example, an energy chain with multiple subdivisions can be provided by an additional central strand, with the number of intermediate pieces increasing radially outwards.

Irrespective of the selected guiding of the line(s) in the rotary guide, the preferred features explained below can be provided.

In one embodiment, the rotary guide can comprise a first disc-shaped end flange. The first point can be arranged in a stationary manner on this first flange. Similarly, at the opposite end face of the rotary guide a second disc-shaped flange can be provided, which is connected in a rotationally fixed manner to the drum-like winding device. Thus, the second point can be arranged on this second flange. Each support sleeve that is provided according to the invention is arranged in this case in a freely rotatable manner with respect to both end flanges. The disc-shaped flanges act as a support or a stop in an axial direction.

For the rotary drive of the winding device, in particular a distinct shaft can be provided. In this case, support sleeves that are provided according to the invention can be mounted in a freely rotatable manner by means of a suitable rotational mounting, e.g. a roller bearing, on the shaft which is provided in any case. This inherently ensures the coaxial arrangement of the components. The winding device can also be arranged on one of the support sleeves in a rotatable manner.

The winding device of the system can in particular take the form of a drum with an energy chain wound thereon in a spiral manner, which guides the coilable and uncoilable longitudinal section of the line(s).

A particular feature of the proposed line guiding system consists in the fact that the line can be continuous and uninterrupted from the spatially fixed connection point to the uncoilable free end. The continuous line can therefore have a first subsection which is wound or unwound on the winding device and a corresponding coilable and uncoilable free end. A second section of the line with the helical guiding course is accommodated in the rotary guide and comprises the end of the line to be attached in a stationary manner to the first point. Thus, each line being guided can pass without interruption from the first point via the second point on the drum-like winding device to the coilable and uncoilable free end (without a rotary connector). This proves particularly advantageous for heavy power-supply cables, such as e.g. multiphase power cables for supplying shore-side power to ships.

Depending on the spoolable line length and line cross-section, the line guiding system according to the invention typically is considerably larger than systems according to the prior art discussed in the introduction. Accordingly, in order to save space, it can be provided that the rotary guide is arranged at least partly within a hollow cylindrical interior of the drum-like winding device, viewed in the axial direction. Depending on the dimensions of the winding device and/or the angle of relative rotation required, the rotary guide can also be accommodated entirely within the hollow space in the drum-like winding device. This allows a relatively compact design, even with long travel distances and large line cross-sections. Thus, the system can be housed e.g. in a standard container.

The proposed line guiding system is suitable in particular for supplying shore-side power to a sea-going vessel, e.g. a container ship, for example when it is in port.

The invention further relates to the rotary guide itself, independently of a drum-like winding device. The rotary guide comprises at least one line, which is guided in the rotary guide from a first point to a second point which can be rotated relative thereto about an axis of rotation. The at least one line here has a helical guiding course in the rotary guide with one or more first helical layers, in which the line is wound about the axis of rotation, one or more second helical layers, in which the line is wound about the axis of rotation in the opposite direction, and therebetween a return curve which connects the two helical layers. In the return curve the line is turned or changes its direction of rotation.

One embodiment is distinguished by the fact that the rotary guide has an outer tubular support sleeve for supporting the helical layers radially outwardly and also an inner tubular support sleeve for supporting the helical layers radially inwardly, both tubular support sleeves being rotatable in a manner such that they are decoupled from the rotation of the second point.

An alternative embodiment of the rotary guide is distinguished by the fact that the rotary guide has at least one tubular support sleeve for supporting the helical layers, and that the rotary guide comprises a line guiding device, in which the line is guided according to the helical guiding course and which has radially oriented support rolls for the purpose of rotary decoupling by rolling over the at least one support sleeve.

The at least one tubular support sleeve can take part in the rotation of the second point in a rotationally fixed manner. The support sleeve can be formed by an existing component, such as e.g. a drive shaft. The support sleeve can in particular, as explained above, also be provided as an additional component. A radially inner and a radially outer support sleeve can also be provided, in which case in particular one of the two or both is/are not rotationally decoupled. As a line guiding device, in particular an energy chain for closed cycles can be used, which is supplemented by appropriate support rolls, e.g. by retrofitting.

If a line guiding device is used, a shaft which is rotatable about the axis of rotation can be provided to drive a device which is rotationally fixed to the second point, in particular a drum-like winding device, over which the support rolls of the line guiding device roll. In this embodiment, no additional inner support sleeve is necessary. In this case an outer tubular support sleeve can be provided, over which further radially oriented support rolls of the line guiding device roll, or which is rotatable in a manner such that it is decoupled from the rotation of the shaft. In this last case, support rolls are provided only radially internally on the line guiding device.

The system and the rotary guide allow multiple supply lines to be guided continuously therein from the first point to the second point, including in particular heavy lines or lines with a large cross-section.

BRIEF DESCRIPTION OF THE DRAWINGS

The invention is explained in more detail below, without limiting the more general description above, with the aid of preferred embodiments illustrated in the drawings. The figures show the following.

DETAILED DESCRIPTION

Figure 7:
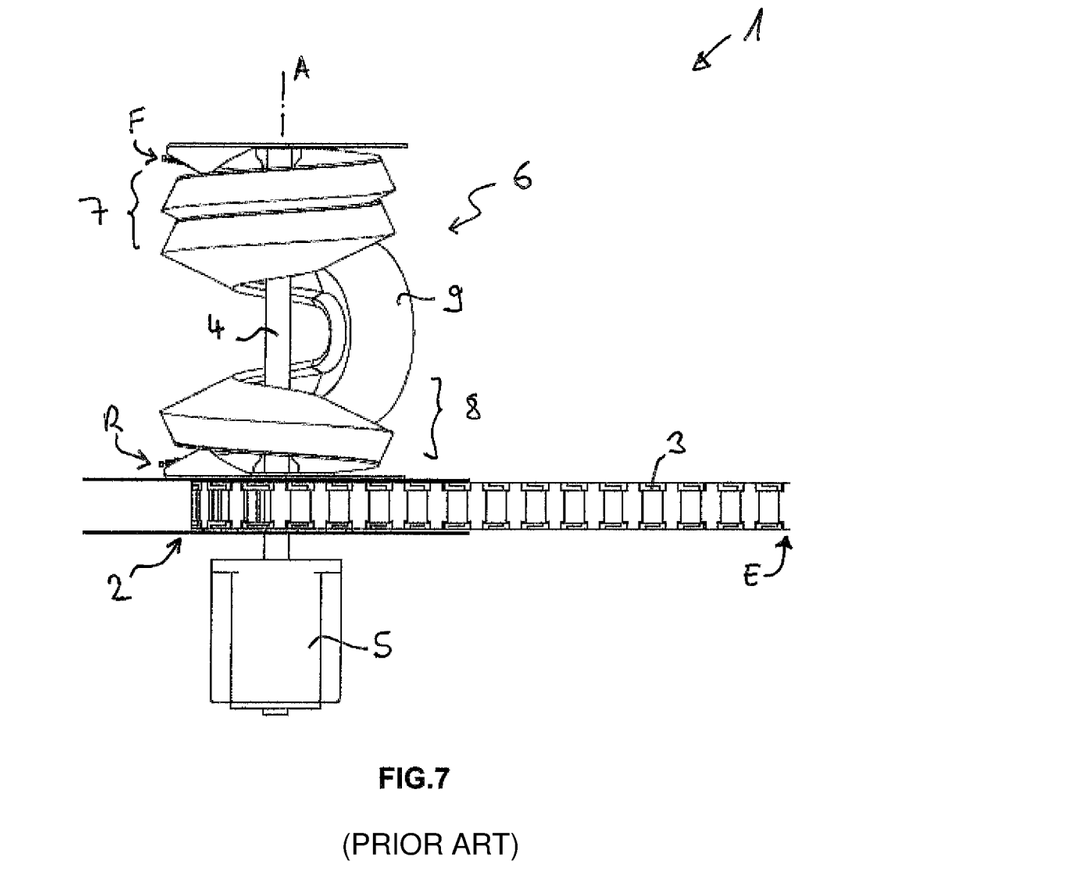
FIG. 7 is a line guiding system according to the prior art (from DE 10 2012 110 967 A1, not according to the invention).

FIG. 7 shows a known line guiding system for lines which can be coiled and uncoiled, such as power cables and hoses e.g. for compressed air or liquid. The line guiding system generally labelled 1 in FIG. 7 comprises a drum-like winding device 2 for the spiral coiling and uncoiling of an energy chain 3, which guides the multiple lines (not shown) in parallel. The winding device 2 is rotatably mounted by means of a shaft 4 and is driven via a drive 5, e.g. an electric motor. The shaft 4 defines an axis of rotation A.

The lines that can be coiled and uncoiled by the winding device 2 pass without interruption from a first, spatially fixed point F via a rotary guide generally labelled 6 to a second point R on the drum of the winding device 2 which is further rotatable relative to the first point F and on to a free end E on the energy chain 3.

To enable a relative rotation between the points F and R to take place over a large angle of rotation about the axis of rotation A, a helical guiding course with a return of the line is provided in the rotary guide 6. A line guiding device designed for this purpose, e.g. according to WO 2011/086198 A2, can define and/or support this helical guiding course.

This guiding course has first helical layers 7, in which the lines being guided are wound helically about the axis of rotation A of the shaft 4, and axially opposite them, second helical layers 8, in which the line guiding device is wound together with the lines being guided therein in the opposite direction of rotation about the axis of rotation A. The two oppositely wound groups of coils 7, 8 are connected to each other via a return curve 9 and thus form runs of turns that can be rotated separately from each other. In the return curve 9, the lines being guided turn around from the one direction of rotation to the opposite direction of rotation. A helical layer 7, 8 is understood in the present case to be each full turn (coil) or partial turn (partial coil) along a helical line about the axis of rotation A between the points F, R, since the remaining circumferential dimension becomes small close to the stop at the points F, R respectively.

The helical guiding course illustrated by way of example in FIG. 7 as a snapshot changes its position according to the relative angle of rotation position of the points F, R. In the event of relative rotation of the winding device 2 with the second point R opposite the first point F, the return curve 9 migrates in an axial direction between the frontal ends at the respective points F, R and the respective number of coils or turns in the groups of the helical layers 7, 8 increases or decreases according to the rotation. For further details of the function and construction of the line guiding system 1 according to FIG. 7, reference should be made to DE 10 2012 110 967 A1, the relevant parts of which are incorporated herein.

Figure 1:
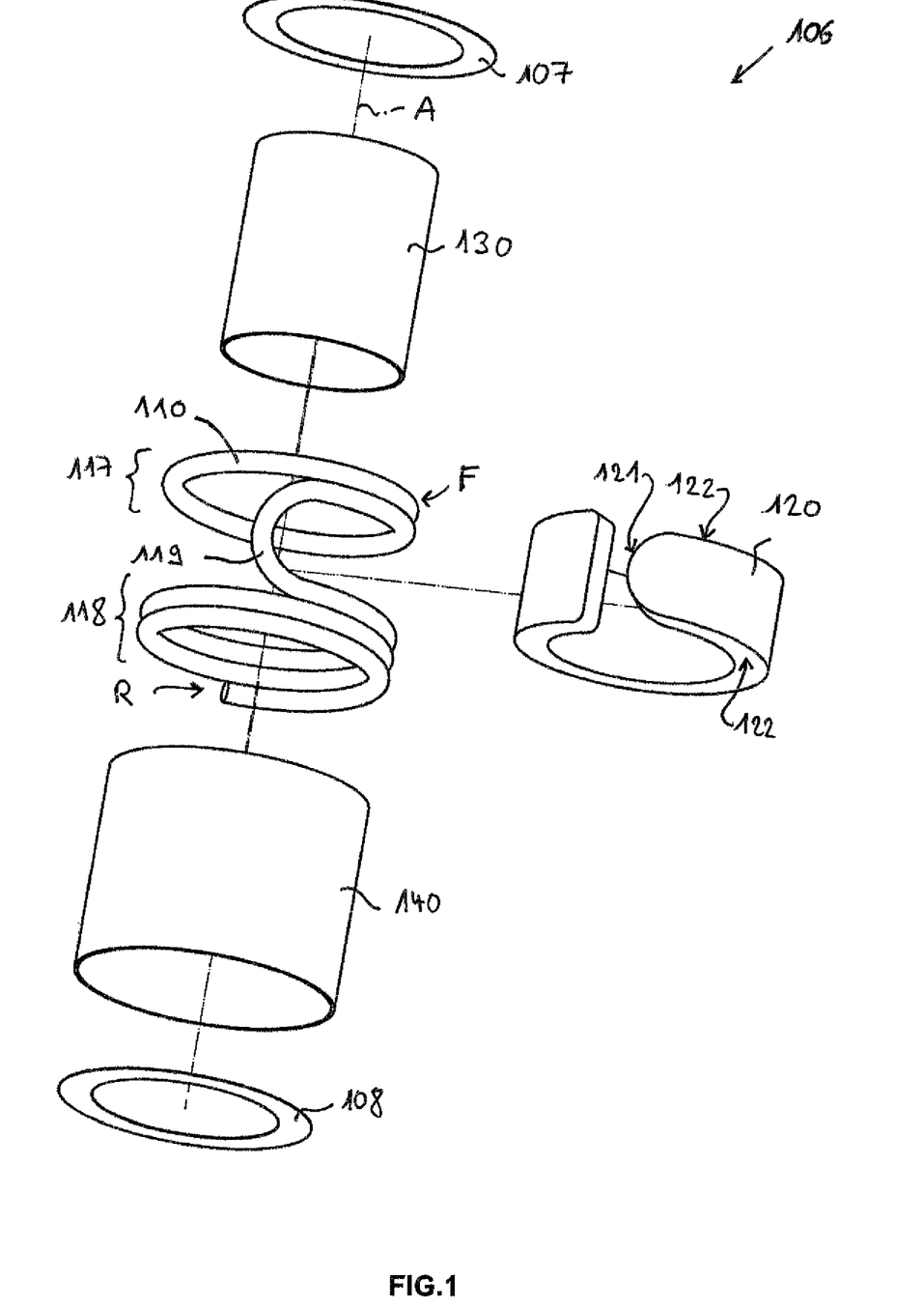
FIG. 1 is a partial view in an exploded perspective illustration of a first exemplary embodiment of the invention with a line guided in an exposed manner in the rotary guide.
Figure 2A:
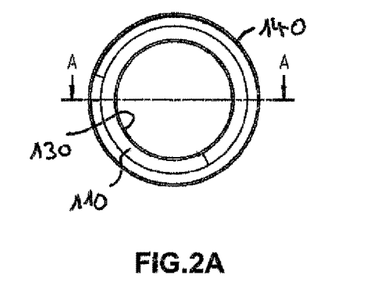
FIGS. 2A-2B are cross-sections through the rotary guide according to FIG. 1 with rotation in the one direction of rotation (FIG. 2A) and in the opposite direction of rotation (FIG. 2B)
Figure 2B:
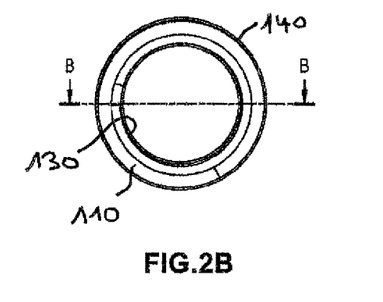

An embodiment according to the invention of a rotary guide 106 is illustrated in FIG. 1. Some components, in particular the drum-like winding device (see FIG. 5), are not shown in FIG. 1 for the sake of clarity. In FIG. 1 a single line 110, e.g. a multi-phase power cable, is being guided in an exposed manner (without a line guiding device or energy chain in the rotary guide 106). In the ready-to-operate state, the line 110, depending on the rotational position, forms one or more helical layers 117 about the axis of rotation A and one or more second helical layers 118 in the opposite direction of rotation about the axis of rotation A. The helical layers 117, 118 are connected to each other by a return curve 119, in which the line 110 is turned. The function of the helical guiding course with the oppositely wound helical layers 117, 118 and the return curve 119 corresponds to FIG. 7. The total number of full coils over the helical layers 117, 118 determines the maximum angle of rotation (one full coil allows approx. a 600° to 720° angle of rotation). The total number of full coils is preferably n≥3.

To support the return curve 119, the rotary guide 106 has a support body 120, with a return region 121 pointing substantially in a circumferential direction. The return region 121 is tapered towards the mid-plane of the support body 120 and transitions into appropriately oblique lateral running surfaces 122, which point predominantly in an axial direction and the tangential surface of which intersects the axis of rotation A.

The return region 121 of the support body 120 in the example shown forms a sliding surface, the shape of which defines the desired guiding course of the abutting return curve 119. It ensures inter alia a gentle minimum radius of curvature of the line 110 in the return curve 119. The support body 120 extends in a circumferential direction over an angular dimension of between 270° to almost 360° and is arranged in a freely rotatable manner about the axis of rotation A. The sliding surface on the return region 121 and on the running surfaces 122 can comprise a coating that reduces sliding friction or a tribologically optimized material. Alternatively, or in addition, friction-reducing running rollers can be provided on the return region 121 and/or on the running surfaces 122 of the support body 120. The support body 120 on the one hand defines the shape of the return curve 119 and on the other hand ensures that oppositely wound helical layers 117, 118 which rotate relative to each other are spaced apart axially so that no friction occurs between the immediately adjacent turns or coils of the two helical layers 117, 118 running in opposite directions. The return region 121 and the running surfaces 122 can also prevent the return curve 119 from "rearing up" by suitable chamfering.

Figure 3A:
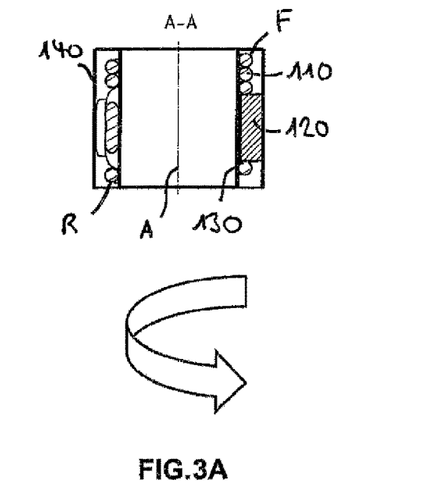
FIGS. 3A-3B are longitudinal sections corresponding to the lines of intersection A-A or B-B from FIG. 2A-2B with arrows indicating the respective directions of rotation.

FIG. 1 further shows a hollow cylindrical inner support sleeve 130 and a hollow cylindrical outer support sleeve 140, which are mounted coaxially with the axis of rotation A as additional components. The support sleeves 130, 140 are tubular, e.g. produced as cut sections of a tube made of steel sheet. The diameter of the outer support sleeve 140 here is greater than the diameter of the inner support sleeve 130 by an amount which is slightly more than twice the line diameter of the line 110, so that there is movement clearance for the line 110 in the intermediate space, as can be seen in FIG. 3A-3B.

On the end faces of the support sleeves 130, 140, the rotary guide 106 has disc-shaped flanges 107, 108 for the axial support of the line 110. The flanges 107, 108 inter alia prevent the helical layers 117, 118 from sliding off axially during operation.

Figure 3B:
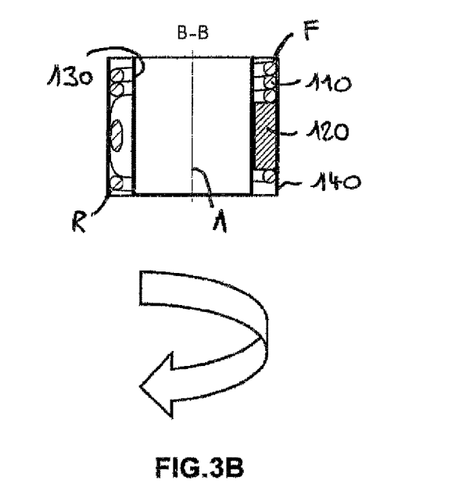

With the aid of FIG. 2A-3B, it is possible to see the way in which the rotary guide 106 works, and in particular the support sleeves 130, 140 according to FIG. 1. When the second point R rotates in a first direction of rotation relative to the fixed first point F (FIG. 2A, 3A), the helical guiding course of the line 110 constricts radially inwards. Thus, the line 110 with at least some or possibly all the coils (as shown here in FIG. 2A-3A) comes radially inwards into a position abutting and supported by the support sleeve 130. When the second point R rotates relative to the first spatially fixed point F in the opposite direction of rotation (FIG. 2B-3B), the opposite effect occurs. The helically arranged line 110 extends radially outwards in this case and lies in a position abutting and supported by the outer support sleeve 140 (FIG. 3B). The additional support sleeves 130, 140 trap the corresponding constriction or extension and thus avoid any detrimental effect on the other moving parts, e.g. the shaft (see FIG. 7) or the drum (see FIG. 5).

In the first exemplary embodiment according to FIG. 1 and FIG. 2A-3B, both the inner support sleeve 130 and the outer support sleeve 140 are, each independently of one another, freely rotatable in relation to the other components, in particular in relation to a shaft of the drum-like winding device (see FIG. 5 or 7), i.e. they are decoupled from the predetermined rotation of the second point R. As a result, an undesirable overloading caused by the effects illustrated in FIG. 3A or FIG. 3B is prevented by simple means.

Figure 4:
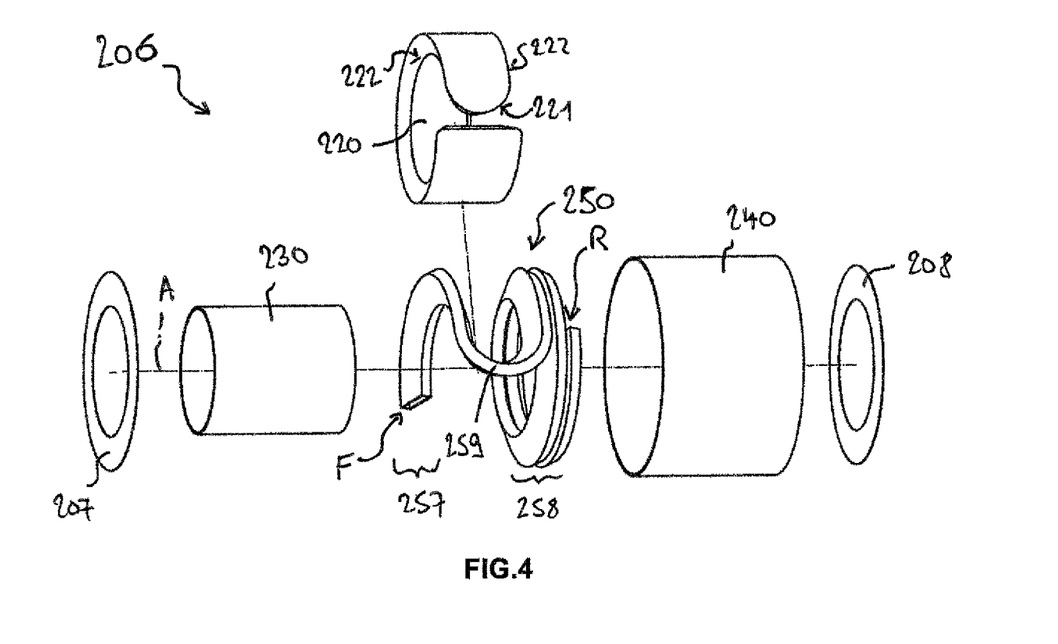
FIG. 4 is a partial view in an exploded perspective illustration of a further exemplary embodiment of a rotary guide for a line guiding system, with a line guiding device in which at least one line is guided.

FIG. 4 shows an alternative exemplary embodiment of a rotary guide 206 according to the invention. This differs from the one above in particular by the fact that in the rotary guide 206 multiple lines (not shown) are guided in an additional line guiding device 250, e.g. an energy chain, according to the desired helical guiding course. By means of a line guiding device 250, tensile and shear loads can be absorbed and their effect on the lines, in particular in the region around the return curve 259, can be avoided The line guiding device 250 according to FIG. 4 also has one or more first helical layers 257 and helical layers 258 running in the opposite direction and a return curve 259 connecting them. With the aid of the line guiding device 250, a desired predetermined helical guiding course can be ensured even when multiple lines are being guided jointly (not shown). The line guiding device 250 can inter alia be pre-tensioned in an axial direction for a favorable helical guiding course. As a line guiding device 250, an energy chain specifically designed for circular configurations, e.g. according to WO 98/31950 A1, can be employed.

In the exemplary embodiment according to FIG. 4, an inner support sleeve 230 and an outer support sleeve 240 are provided, which can be tubular and can be mounted in a freely rotatable manner coaxially with the axis of rotation A, e.g. with the aid of a suitable rotational mounting on a shaft of the winding device which is not shown (see FIG. 7). In the rotary guide 206, the inner support sleeve 230 compensates for a constriction of the line guiding device 250 radially inwards and the outer support sleeve 240 compensates for an extension of the line guiding device 250 radially outwards.

The other components of the rotary guide 206 correspond in terms of their functions to those of FIG. 1, with reference numbers increased by a hundred, the support body 220 being adapted to the radius of curvature of the line guiding device 250 about the axis of rotation A and the radius of curvature of the return curve 259. The overall dimensions can be greater, e.g. for multiple, longer and/or heavier lines.

It also lies within the scope of the invention for the support sleeves 230, 240 not to be of a freely rotating configuration when a line guiding device 250 is used. In this case, the rotary movement of the support sleeves 230, 240 can be coupled with that of the second point R or of the first point F, which can represent a simpler construction in the case of particularly large diameters. The rotary decoupling of the lines or line guiding device 250 to avoid damaging friction caused by the constriction or extension effect (FIG. 3A or FIG. 3B) can be achieved by a design of an energy chain 550 with radially oriented support rolls 551, 552 shown by way of example in FIG. 5A-5B. This alternative to the decoupled rotatability of the support sleeves 230, 240 can be provided on both sides, radially inwardly and radially outwardly, or combined in parts, e.g. with support rolls radially inwardly and a freely rotatable support sleeve radial outwardly. In the latter case, the radial inner support sleeve can be omitted if the line guiding device 250 can roll over a shaft.

Figure 5A:
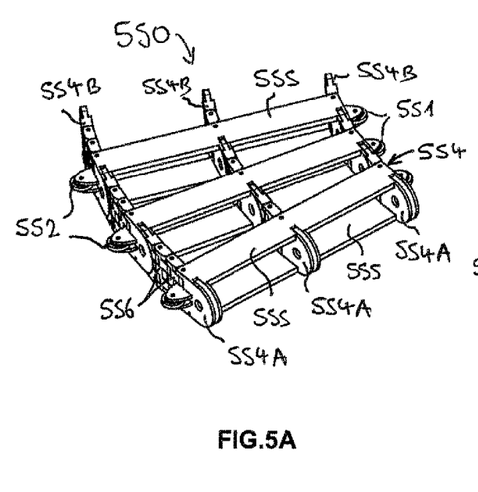
FIGS. 5A-5B are a preferred exemplary embodiment of an energy chain as a line guiding device for use in a rotary guide e.g. according to FIG. 4.
Figure 5B:
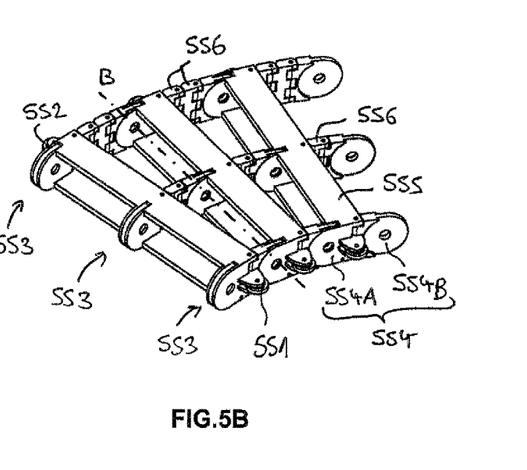

An energy chain 550 according to the invention, illustrated in FIG. 5A-5B only as a small representative longitudinal section, for use as a line guiding device e.g. in the setup according to FIG. 4, has multiple strands 553 composed of individual parts of a modular system comprising side links 554 and cross-pieces 555. The side links 554 and cross-pieces 555 are interconnected via the cross-pieces 555 in a stable and approximately parallel manner, so that an accommodating space for the lines is formed therebetween.

In the central link strand and in the radially outer link strand 553, additional intermediate pieces 556 are provided, which adjust the length of the strand such that the energy chain 550 overall runs in a laterally curved manner. This enables the desired spiral or helical guiding course (FIG. 4) to be achieved.

In order to be able to insert optional intermediate pieces 556, the side links 554 are composed of two releasable, conjugated link sections 554A, 554B in a longitudinal direction. A first link section 554A has on one end a fork-like receiver, in which the other tab-like end of an opposite second link section 554B engages. These approximately semicircular ends are each connected in a pivotally articulated manner via a suitable articulated bolt/bore connection about a pivot axis B. In the installed position (FIG. 4), the pivot axis B runs approximately radially or perpendicularly through the axis of rotation A respectively. A pivot angle limiter (not shown) is provided in a suitable manner known to the person skilled in the art on the side links 554, which limits the maximum pivot angle of the articulated joint to preserve a minimum radius of curvature in the return curve 259 (FIG. 4) of the energy chain 550.

At the ends of the link sections 554A, 554B which are to be joined together to form a side link 554, approximately E-shaped interfaces with serrations are provided, through the mutually engaging projections of the side link 554 of which a split pin or pin (not shown) projects, which lies centrally and in the main plane of the side link 554 and optionally also secures the cross-pieces 555. About the axis of the split pin or pin, which is perpendicular to the pivot axis B in the main plane, the link sections 554A, 554B of a side link 554 are laterally pivotable over a small angle for the purpose of the lateral curvature of the energy chain 550, as illustrated in FIG. 5A-5B. The intermediate pieces 556 correspondingly have interfaces on both sides matching the interfaces of the link sections 554A, 554B for the purpose of connection to the link sections 554A, 554B, as can be seen most clearly in FIG. 5B. The link sections 554A, 554B can be formed symmetrically for use in all strands, in order to increase the number of identical parts in the modular system. The link sections 554A, 554B, cross-pieces 555 and intermediate pieces 556 are preferably made of plastic in an injection molding process.

The support rolls 551, 552 can be mounted via retaining arms, which are integrally formed on one of the two link sections 554A, 554B. The support rolls 551, 552 each lie perpendicular to the main plane of the side link 554 and in the operating position can be rotated about a tangential axis of rotation, perpendicular to the pivot axis B. The support rolls 551, 552 allow the energy chain 550 to roll in a very low-friction manner, e.g. over the additional support sleeves 230, 240, over a shaft as an inner support (see FIG. 7) or over the inside of a drum of the winding device (see FIG. 6) as an outer support. Thus, the function of rotary decoupling can also be achieved via an energy chain 550 with support rolls 551, 552 as in FIG. 5A-5B, e.g. in a setup according to FIG. 4. The support rolls 551, 552 can also be provided on retrofittable, separate add-on parts.

Figure 6:
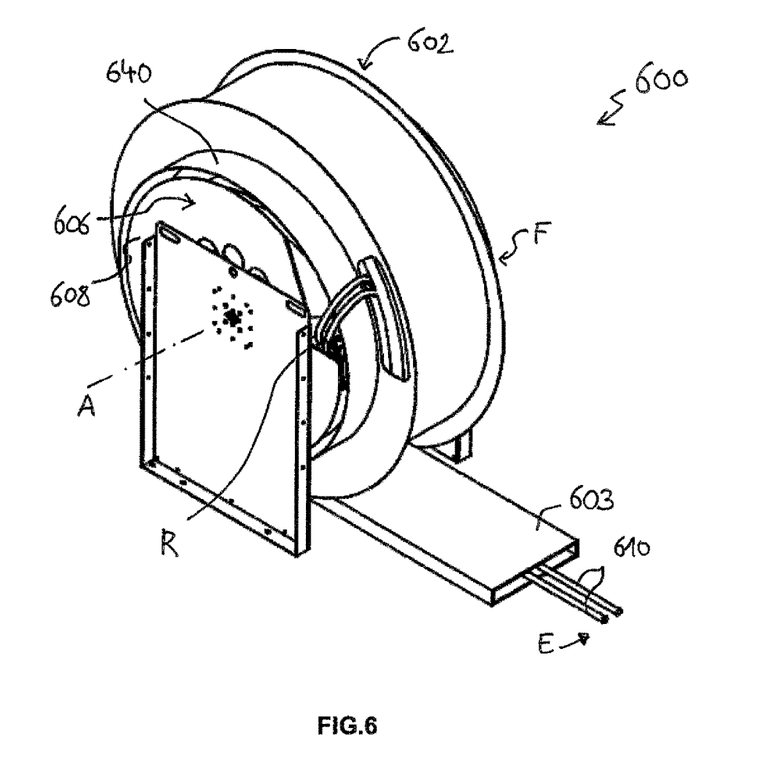
FIG. 6 is a perspective diagram of a line guiding system with a drum-like winding device for coiling and uncoiling multiple lines and with a rotary guide, e.g. according to FIG. 1 or FIG. 4.

FIG. 6 shows by way of example an overall line guiding system 600 for multiple lines 610 which can be coiled and uncoiled. The line guiding system 600 comprises a winding device, e.g. as a drum 602, with a large internal hollow space, and a rotary guide 606, which is accommodated predominantly in the hollow space of the drum 602 to save space. On the drum 602 a suitable energy chain 603, shown schematically in FIG. 6, is wound in a spiral manner for coiling and uncoiling the free end E of the lines 610.

The rotary guide 606 can be formed in FIG. 6 according to the principle from FIG. 1, i.e. with an outer support sleeve 640 which can be freely rotated relative to the drum 602 and a freely rotatable inner support sleeve 630 (not visible in FIG. 6), or e.g. with an energy chain 550 which uncouples the rotation according to FIG. 5A-5B in a setup according to FIG. 4, wherein support sleeves turn e.g. synchronously with the drum 602. Instead of separate components, when an energy chain 550 with support rolls 551, 552 is used (FIG. 5A-5B), the support sleeves can thus also be formed e.g. by the inside of the drum 602 and a hollow shaft supporting the drum such that it is rotatable about the axis A (not visible in FIG. 6). The lines 610 pass from the rotatable point R of the rotary guide 606 to the end fixed on the drum 602 and from there without interruption to the free end E of the drum-side energy chain 603. On the other hand, the lines 610 pass via the rotary guide 606 without interruption to the fixed point (not shown) and optionally on from there to the respective attachment or connection points. The energy chain 550 in the setup according to FIG. 4, or the line 110 in the setup according to FIG. 1, is guided by the components of the rotary guide 606 in all directions, so that rotary movement can take place without snagging or jamming.

The line guiding system 601 according to the invention is particularly suitable for heavy lines 610 and/or lines with large line cross-sections, e.g. for power cables for supplying multi-phase shore-side power to sea-going vessels.

LIST OF REFERENCE CHARACTERS

FIGS. 1, 2A-2B, 3A-3B
106 Rotary guide
107, 108 Flange discs
110 Line
117 First helical layers
118 Second helical layers
119 Return curve
120 Support body
121 Return region
122 Running surface
130 Inner support sleeve
140 Outer support sleeve
A Axis of rotation
E Free end
F Spatially fixed point
R Rotatable point
FIG. 4
206 Rotary guide
207, 208 Flange discs
220 Support body
221 Return region
222 Running surface
230 Inner support sleeve
240 Outer support sleeve
250 Line guiding device
257 First helical layers
258 Second helical layers
259 Return curve
A Axis of rotation
F Spatially fixed point
R Rotatable point
FIG. 5A-5B
550 Energy chain
551, 552 Support rolls
554 Side link
554A, 554B Link sections
555 Cross piece
556 Intermediate piece
B Pivot axis
FIG. 6
601 Line guiding system
602 Drum
603 Energy chain
606 Rotary guide
608 Flange disc
610 Lines
640 Outer support sleeve
A Axis of rotation
R Rotatable point
FIG. 7 (Prior Art)
1 Line guiding system
2 Winding device
3 Energy chain
4 Shaft
5 Drive
6 Rotary guide
7 First helical layers
8 Second helical layers
9 Return curve
A Axis of rotation
F Spatially fixed point
R Rotatable point

What is claimed is:

1. A line guiding system, comprising:
 a drum-like winding device to coil and uncoil at least one line which is rotatable about an axis of rotation through a shaft; and
 a rotary guide to guide the at least one line from a first point to a second point, the rotary guide connected to the winding device in a rotationally fixed manner and which is rotatable relative to the first point, wherein the rotary guide has a helical guiding course with one or more first helical layers, in which the at least one line is wound about the axis of rotation in a first direction, one or more second helical layers, in which the at least one line is wound about the axis of rotation in a second direction opposite the first direction, and a return curve which connects the first and second helical layers and in which the at least one line is turned;

wherein the rotary guide has an outer tubular support sleeve and/or an inner tubular support sleeve arranged coaxially with the axis of rotation, which support the first and second helical layers radially outwards and/or radially inwards, respectively, and a rotary decoupling structure, based on which the first and second helical layers supported on the support sleeve are rotatable about the axis of rotation such that the first and second helical layers are decoupled from the winding device.

2. The line guiding system according to claim 1, including the inner tubular support sleeve, which for rotary decoupling, is rotatable relative to the winding device and about the axis of rotation by a rotational mounting.

3. The line guiding system according to claim 1, including the outer tubular support sleeve, which for rotary decoupling, is rotatable relative to the winding device and about the axis of rotation by a rotational mounting.

4. The line guiding system according to claim 1, wherein the at least one line is guided in the rotary guide without a line guiding device accommodating the at least one line and is supported directly on the outer tubular support sleeve or the inner tubular support sleeve, depending on rotation in the first direction or the second direction.

5. The line guiding system according to claim 1, wherein the rotary guide comprises a support body for the return curve, the support body being bent about the axis of rotation, with a return region pointing in a circumferential direction, which is adapted to the return curve, wherein the support body is freely rotatable relative to the outer tubular support sleeve and/or the inner tubular support sleeve.

6. The line guiding system according to claim 5, including the outer tubular support sleeve and the inner tubular support sleeve, and wherein the support body is guided between the outer tubular support sleeve and the inner tubular support sleeve in an axially displaceable manner of a sliding bearing.

7. The line guiding system according to claim 5, wherein the support body has a continuous sliding surface or guide rolls at least on the return region to reduce friction.

8. The line guiding system according to claim 1, wherein the rotary guide comprises a line guiding device in which the line is guided according to the helical guiding course, and the line guiding device comprises support rolls for rotary decoupling.

9. The line guiding system according to claim 8, wherein the line guiding device comprises an energy chain with a plurality of pivotally connected chain links, which each chain link of the plurality of chain links comprising at least an inner side link, an outer side link and a cross-piece connecting the inner side link and the outer side link, and wherein for rotary decoupling
a radially inwardly oriented support roll is provided on at least some of each of the inner side links; and/or
a radially outwardly oriented support roll is provided on at least some of each of the outer side links.

10. The line guiding system according to claim 9, wherein the energy chain has a longer outer link strand and a shorter inner link strand to form the helical guiding course, wherein the outer link strand has at least one intermediate piece between every two pairs of pivotally connected side link parts.

11. The line guiding system according to claim 1, wherein the rotary guide is provided at end regions with a first disc-shaped flange, on which the first point is arranged in a stationary manner, and a second disc-shaped flange, which is connected in a rotationally fixed manner to the drum-like winding device and on which the second point is arranged, wherein the outer tubular support sleeve and/or the inner tubular support sleeve is/are freely rotatable relative to both flanges.

12. The line guiding system according to claim 1, including the shaft for driving the winding device, wherein the outer tubular support sleeve and/or the inner tubular support sleeve is/are mounted on the shaft in a freely rotatable manner by a rotational mounting.

13. The line guiding system according to claim 1, including the at least one line as a multi-phase power cable, wherein the at least one line comprises a first section wound on the drum-like winding device, with a coilable and uncoilable free end, and a second section accommodated in the rotary guide with the helical guiding course and an end that is attachable in a stationary manner to the first point, wherein the at least one line is continuous and uninterrupted from the first point via the second point to the coilable and uncoilable free end.

14. The line guiding system according to claim 1, wherein the rotary guide is arranged at least partly within the drum-like winding device in an axial direction or is entirely accommodated therein.

15. The line guiding system according to claim 1, wherein the line guiding system is for supplying shore-side electricity to a sea-going vessel.

16. The line guiding system according to claim 1, wherein the at least one line comprises multiple supply lines which are guided continuously from the first point to the second point.

17. A rotary guide for a line guiding system, comprising:
at least one line, which is guided in the rotary guide from a first point to a second point which is relatively rotatable about an axis of rotation relative to the first point, wherein the at least one line has a helical guiding course in the rotary guide with one or more first helical layers, in which the at least one line is wound about the axis of rotation in a first direction, one or more second helical layers, in which the at least one line is wound about the axis of rotation in a second direction opposite the first direction, and a return curve which connects the first and second helical layers and in which the at least one line is turned;
wherein the rotary guide has an outer tubular support sleeve for supporting the first and second helical layers radially outwards and an inner tubular support sleeve for supporting the first and second helical layers radially inwards, and
wherein the outer tubular support sleeve and the inner tubular support sleeve are rotatable such that the outer tubular support sleeve and the inner tubular support sleeve are decoupled from the rotation of the second point.

18. A rotary guide for a line guiding system, comprising:
at least one line, which is guided in the rotary guide from a first point to a second point which is rotatable relative to the first point about an axis of rotation, wherein the at least one line has a helical guiding course in the rotary guide with one or more first helical layers, in which the at least one line is wound about the axis of rotation in a first direction, one or more second helical layers, in which the at least one line is wound about the axis of rotation in a second direction opposite the first direction, and a return curve which connects the first and second helical layers and in which the at least one line is turned;

wherein the rotary guide has at least one tubular support sleeve for supporting the helical layers radially outwards or radially inwards, and wherein the rotary guide comprises a line guiding device, in which the at least one line is guided according to the helical guiding course and which has radially oriented support rolls for rotary decoupling by rolling over the at least one tubular support sleeve.

19. The rotary guide according to claim 18, further comprising a shaft that is rotatable about the axis of rotation for driving a device which is rotationally fixed to the second point, and wherein the support rolls roll over the shaft.

20. The rotary guide according to claim 19, wherein the line guiding device comprises further radially oppositely oriented support rolls, which roll over an outer support sleeve.

21. The rotary guide according to claim 19, wherein the outer tubular support sleeve is rotatable such that the outer tubular support sleeve is decoupled from the rotation of the shaft.

* * * * *